(12) United States Patent
Grison

(10) Patent No.: US 6,923,368 B2
(45) Date of Patent: Aug. 2, 2005

(54) AUTOMATED SYSTEM FOR FILLING IN AND DELIVERING OFFENCE TICKETS

(76) Inventor: Paul Grison, Les Mas de Pierrine, 16, rue d'Opio, F-06560 Valbonne (FR)

( * ) Notice: Subject to any disclaimer, the term of this patent is extended or adjusted under 35 U.S.C. 154(b) by 0 days.

(21) Appl. No.: 10/473,467
(22) PCT Filed: Mar. 28, 2002
(86) PCT No.: PCT/FR02/01103
§ 371 (c)(1), (2), (4) Date: Feb. 17, 2004
(87) PCT Pub. No.: WO02/079894
PCT Pub. Date: Oct. 10, 2002

(65) Prior Publication Data
US 2004/0140355 A1 Jul. 22, 2004

(30) Foreign Application Priority Data
Mar. 29, 2001 (FR) .......................................... 01 04274

(51) Int. Cl.[7] .............................................. G06F 17/00
(52) U.S. Cl. ...................... 235/375; 235/384; 235/487; 235/492; 235/493
(58) Field of Search ................................ 235/375–376, 235/384, 487, 492–493; 705/13–14

(56) References Cited

U.S. PATENT DOCUMENTS

| | | | | |
|---|---|---|---|---|
| 4,182,062 A | * | 1/1980 | Krokos et al. ................. 40/209 |
| 4,828,406 A | * | 5/1989 | Mosciatti et al. ............. 400/23 |
| 5,263,118 A | * | 11/1993 | Cornelison .................. 704/200 |
| 5,550,360 A | * | 8/1996 | Muraoka .................... 235/384 |
| 5,648,906 A | * | 7/1997 | Amirpanahi ................. 705/418 |
| 6,222,463 B1 | * | 4/2001 | Rai ............................ 340/928 |
| 6,224,109 B1 | * | 5/2001 | Yang ........................... 283/77 |

FOREIGN PATENT DOCUMENTS

| | | | |
|---|---|---|---|
| FR | 2 771 530 | | 5/1999 |
| GB | 2284290 | | 5/1995 |
| IT | 1253981 | | 9/1995 |
| JP | 359071565 A | * | 4/1984 |
| JP | 63-128472 | | 6/1988 |
| WO | WO 97/14116 | | 4/1997 |

OTHER PUBLICATIONS

Mandy, Damien et al. (WO 2004/055736 A1), Method for Managing Pay Parking Spaces Using Electronic Parking Tickets, (Jan. 7, 2004).*

* cited by examiner

Primary Examiner—Diane I. Lee
Assistant Examiner—Kimberly D. Nguyen
(74) Attorney, Agent, or Firm—James C. Lydon

(57) ABSTRACT

A system for filling in and delivering offence tickets which includes a portable input device (12) provided to a police officer (10), an offence ticket which is a tamper-resistant, contact-free smart card (14) adapted to be presented in front of the input device so as to record data concerning the vehicle, clipping means for the police officer to clip the ticket on the wind screen wiper arm so that the ticket remains undamaged by rain and cannot be easily removed after it has been clipped, a consultation device (18) enabling the owner to take cognizance and print out data concerning the offence, a processing center (22) containing data concerning all running vehicles, and microwave link access means (22) enabling the police officer to obtain data concerning the offending vehicle from the processing center.

9 Claims, 3 Drawing Sheets

AUTOMATED SYSTEM FOR FILLING IN AND DELIVERING OFFENCE TICKETS

Figure 1:
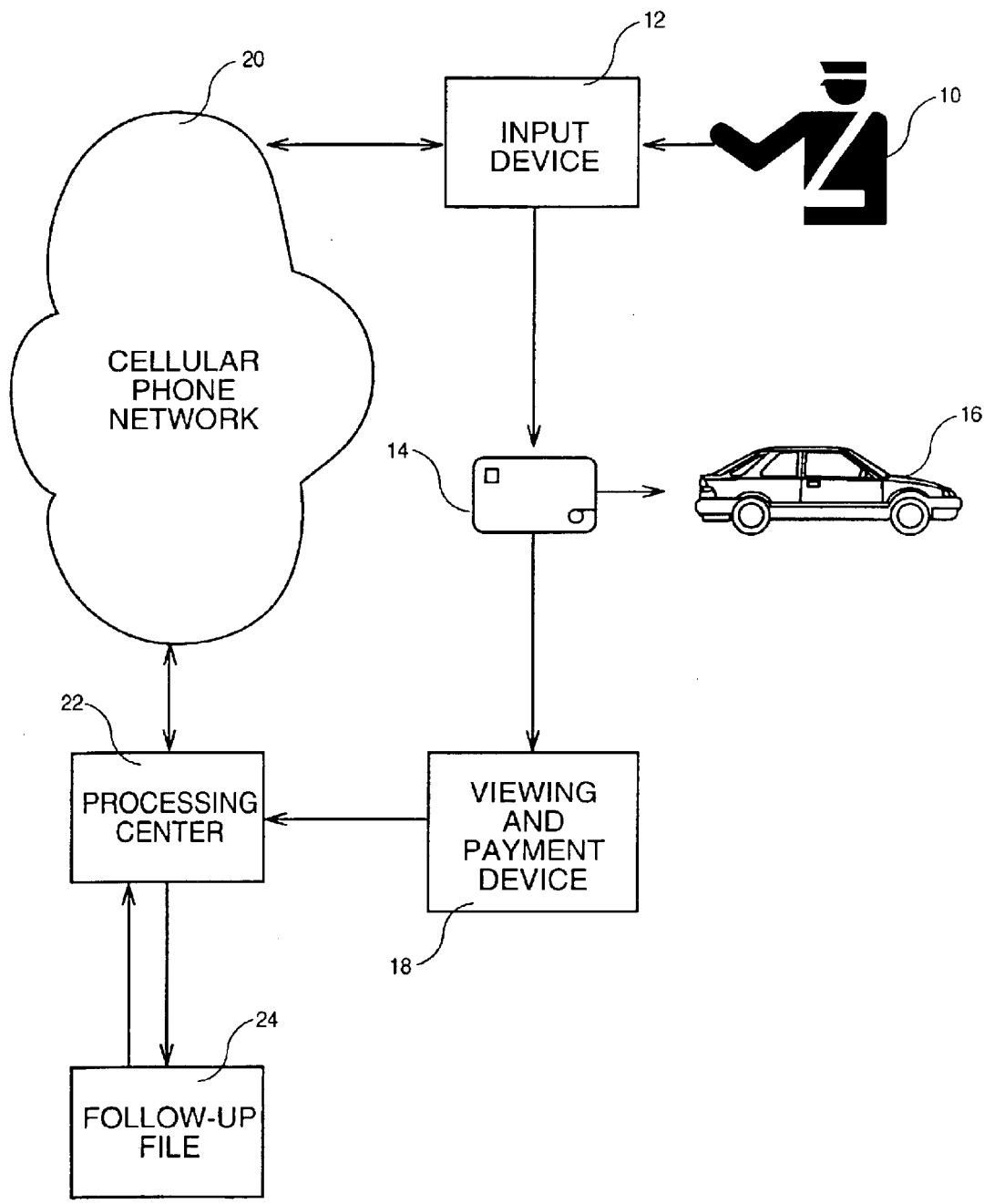

This application is a U.S. National Stage of International Application PCT/FR02/01103, filed Mar. 28, 2002.

This invention concerns the establishment and the payment of offence tickets issued by policemen in charge of ticketing vehicles parked illegally on public thoroughfares or guilty of other traffic offences, and relates particularly to an automated system for issuing and managing these offence tickets.

Currently, in most countries, the ticketing of vehicles on public thoroughfares by a police officer or traffic warden is carried out by manually filling in the date, time and parking location, as well as vehicle-related information such as the license number, make, etc. Once completed, the ticket is placed under the vehicle's windshield wiper. Once in possession of this document, the owner of the ticketed vehicle either pays the fine by buying a fine stamp in a tobacconist's shop, the fine stamp is then pasted on the ticket and sent to the Public Treasury as is the case in France, or pays the fine directly in a Post Office, a police station or tax office as is the case in most other countries.

Actually, this system presents several disadvantages. Specifically, the police officer who issued the ticket is faced with a tedious and time-consuming task as he/she must fill in, by hand and in duplicate, all of the information on the ticket and in the ticket book. This takes a considerable amount of time and is not particularly efficient. Furthermore, the administrative processing of the tickets is very difficult to manage.

Another major disadvantage stems from the fact that the ticket is placed under the vehicle's windshield wiper. If it rains once the ticket is placed on the vehicle's windshield, it becomes wet or even soaked, difficult to handle and often altered, making it unusable for the payment operation. In addition, as the tickets are simply placed under the windshield wiper, they are sometimes removed as a joke or removed by dishonest motorists who place the ticket under the windshield wiper of their own vehicle in an attempt to avoid having a police officer place a ticket on it thinking that the vehicle has already been ticketed. In such cases, the ticketed motorist is not aware that he/she received a ticket and will thus have to pay a higher fine when claimed at a later date, thereby increasing the already high volume of disputed tickets.

An offence ticket processing system described in patent application FR-A-2.665.779 enables a certain number of the above-mentioned disadvantages to be solved, owing to the use of a portable self-contained terminal featuring an alphanumeric keyboard, a screen and a printer capable of printing a barcode on a traffic ticket entered by the police officer using the keyboard. Unfortunately, insofar as the system described in document FR-A-2.665.779 still uses tickets made of paper or other alterable material, the disadvantage of having the ticket ruined by rain still exists, or of having the ticket removed from the ticketed vehicle and placed on another vehicle, or even the barcodes falsified by an offender who wants to add or remove bars, thus making way to unacceptable forging possibilities in this sensitive application field, the implementation of which must be based on total security and reliability.

The system described in patent application PCT FR98/02509 enables the above-mentioned disadvantages to be offset by using an unalterable tamper-resistant smart card as a ticket medium which is clipped on the windshield wiper of the ticketed vehicle after the police officer has recorded the information concerning the offence. To this end, he/she uses a portable input device in which he/she records all the offence tickets that he/she issued during his/her duty period. At the end of his/her duty period, the police officer returns to the police station where he/she connects the portable input device by which the data relative to the offences recorded are automatically transmitted to the processing center. Unfortunately, this system presents the major disadvantage of only transmitting the offences to the processing center at the end of the police officer's duty period, which may sometimes be several hours after they have been recorded. The police officer thus cannot know if the ticketed vehicle is stolen when the ticket is issued. In addition, in case the input device becomes lost or stolen, the data pertaining to the recorded offences is permanently lost.

This is why the purpose of the invention is to provide a system for issuing and managing offence tickets in which the police officer has real-time access to information related to the vehicle and in which the data relative to the offence is recorded immediately within the ticket processing center.

The object of the invention is thus a system for issuing and managing offence tickets comprising a portable input device provided to the police officer in charge of ticketing a contravening vehicle for recording herein data concerning the vehicle, an unalterable tamper-resistant ticketing card adapted to be inserted into the input device so as to record therein the vehicle-related data, clipping means enabling the police officer to clip the card onto the wiper arm such that the card is not damaged by rain and cannot be easily removed after it has been clipped, a viewing device provided with a display screen, a printer and a ticketing card reading means to enable the vehicle owner to access data concerning the offence. The system further comprises a processing center containing the information relative to all registered vehicles included the hired vehicles, and access means to the cellular phone network located to enable the police officer to obtain information concerning the ticketed vehicle from the processing center after having transmitted the ticketed vehicle's license number to the processing center via the cellular phone network.

Figure 2:
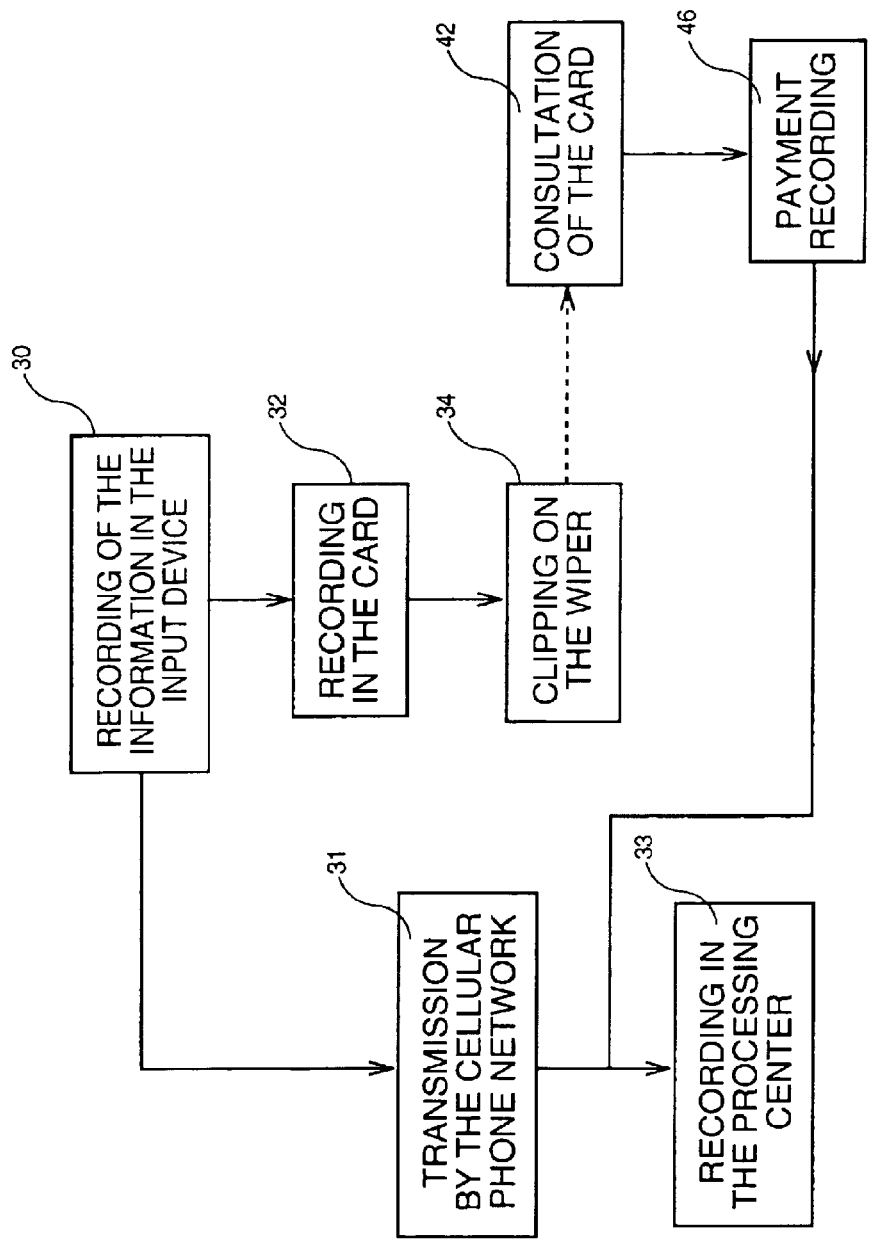
Figure 3A:
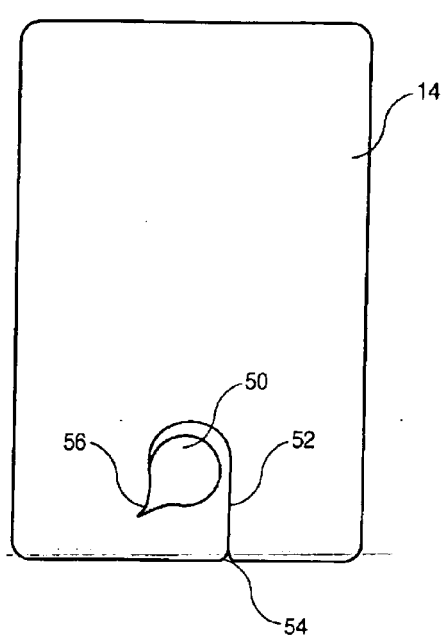
Figure 3B:
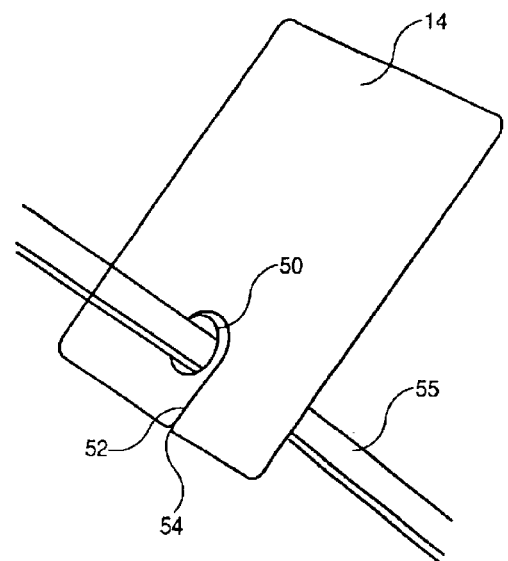
Figure 4A:
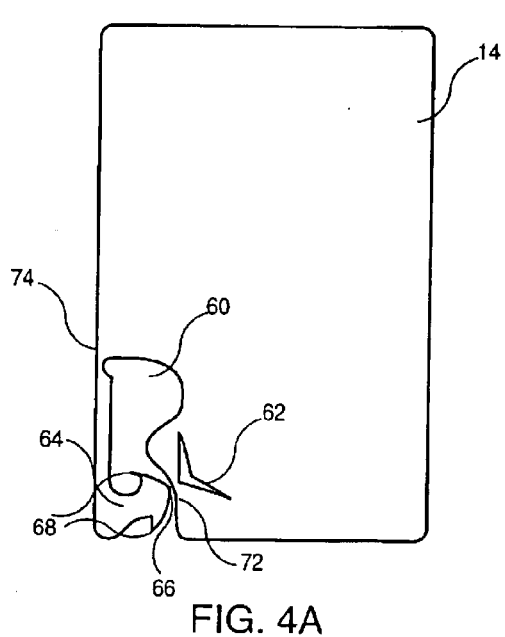
Figure 4B:
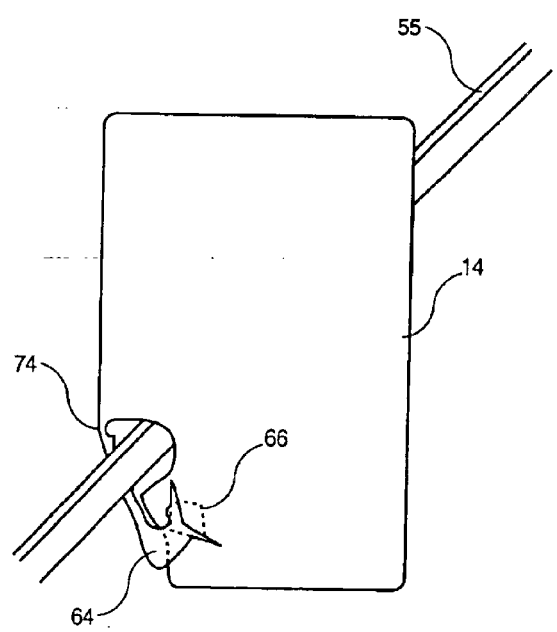

The purposes, objects and features of the invention will become more apparent from the following detailed description with reference to the accompanying drawings, in which:

FIG. 1 is a block diagram which schematically represents all of the elements of the system for issuing and managing offence tickets according to the invention, FIG. 2 is a flow chart representing the operations to be performed in the system according to the invention, as shown in FIG. 1, FIGS. 3A and 3B represent an initial embodiment of the electronic ticketing card used in the system according to the invention, and FIGS. 4A and 4B represent a second embodiment of the electronic ticketing card used in the system according to the invention.

As depicted diagramatically in FIG. 1, the police officer (or traffic warden) 10 is equipped with an input device 12 equipped with a GSM module for the access to the cellular phone network and possibly a GPS module enabling the input device to be located automatically. The latter enables the police officer to issue all contravening vehicles 16 a ticketing card 14 which is a clippable electronic card of the smart card type, this unalterable and tamper-resistant ticket card constituting the essential element of the system for issuing and managing offence tickets according to the invention. The input device 12 is in the form of a small hand-held unit, for example 15 cm long, 10 cm wide and 2 cm thick.

It is equipped with a waterproof alphanumerical keyboard, a 16-character two-line screen, a card on which the electronic components are mounted, a rechargeable battery, a date/time stamping function and a smart card reader/recorder for the card type 14. It enables complex security algorithms to be computed in complementarity with those of the card 14, and corresponding certificates to be written.

The plastic card 14 is rendered tamper-resistant by the use of complex algorithms and the storage of information in tamperproof zones. Preferably, this is a smart card that is disposable, non-reusable and fully protected, especially from being copied. Providing these features is the only means of ensuring totally secure data processing.

The operation of the system according to the invention illustrated in FIG. 1 is depicted by the flow diagram represented in FIG. 2.

Firstly, at the start of his/her duty period, the police officer identifies himself/herself by presenting his/her personal identification smart card in front of the input terminal. Next, when the police officer wants to ticket a vehicle, he/she simply enters the vehicle's license plate number into the input device using a keyboard. As the input device is equipped with a GSM module, the license number is automatically transmitted by the cellular phone network 20 (by means of the SMS procedure) to a ticket processing center 22. As the latter is connected to the vehicle registration file, the processing center immediately locates the vehicle corresponding to the license number. The vehicle's characteristics (type, make, etc.) are then instantly retransmitted and recorded in the input device unless the vehicle is declared as stolen. If a vehicle is declared as stolen, the ticketing operation is not carried out and the location of the vehicle is automatically reported to the processing center 22.

When the license number is entered into the input device by the police officer, the GPS module (when the device is so equipped) communicates the encrypted position of the input device to the processing center. This information is decrypted and instantly retransmitted unscrambled to the input device 12 at the same time as the vehicle-related information. While the police officer could enter the location data himself/herself, the use of the GPS module enables always exact positioning and automatic recording of the vehicle by the processing center, enabling the latter to automatically record stolen vehicles.

Finally, the input device records the following information (step 30):
1. the data entered by the police officer, namely the vehicle's license number and offence type,
2. the data supplied by the input device, namely the date and exact time (hour, minutes) and the legal articles or decree relative to the type of offence in question,
3. the data received from the processing center, that is whether the vehicle is reported as stolen, the vehicle type and make, and the vehicle's GPS position.

The information above, recorded in the input device, are then recorded (step 32) onto the card 14 which the police officer has inserted into the input device 12, and transmitted (step 31) via the cellular phone network 20 so that they can be recorded at the processing center 22 (step 33). Once the data is recorded on the card 14, the police officer clips it onto the vehicle's windshield wiper (step 34) using the clipping means described below.

The information recorded at the processing center 22 is automatically stored in a follow-up file 24 for a certain period of time (preferably 3 or 4 days). Access to this follow-up file is only authorized to duly empowered individuals, such as police commissioners for example. In this manner, a police commissioner may be lenient on an offender and remove the offence from the follow-up file during this storage period.

Upon returning to the vehicle, the vehicle owner recovers the card 14 by unclipping it from the windshield wiper and consults it (step 42) by means of a viewing device 18 which may be located in a tobacconist's shop or in a tax office. Such a device includes a display screen on which all of the information concerning the offence is displayed as soon as the ticketing card is presented in front of the card reader provided for this purpose, and a document with the same information is printed. It should be noted that the viewing devices may also be consultation terminals installed on thoroughfare or in strategic locations such as service stations, supermarkets, parking lots, etc.

The viewing device 18 may also have a second slot that can be used to allow the offender, or any other person in possession of the ticket card, to pay the fine. In the case where this payment may be made (step 44), the person responsible for collecting the payment at the tobacconist's shop or tax office records (step 46) this payment to the processing center in the viewing (and payment) device 18 and a receipt is issued to the person making the payment. It should be noted that if the viewing device is a payment terminal, payment can only be made by bank card. In this case, a receipt is issued by the terminal and the latter automatically transmits the information relative to the payment to the processing center 22.

All payments made using a viewing (and payment) device 18 are transmitted to the processing center. In this case, each payment made by means of one of the viewing and payment devices deletes the information contained in the follow-up file 24 if said payment is made during the storage period. In addition to receiving fine payments, it should be noted that the role of the processing unit 22 is to send out reminders and apply late fees for payment delays and to handle information requests and appeals.

In order to prevent the card from being removed too easily from the windshield of the contravening vehicle, the ticket card is equipped with a clipping means described below.

According to an initial embodiment, which is not restrictive, illustrated in FIGS. 3A and 3B, the ticketing card 14 includes an opening 50 having a slot 52 continuing down its side. A special cut-out 54 is made at the outside end of this slot on the edge of the card.

The card is clipped by pressing the special cut-out 54 against the wiper arm 55. The cut-out makes separating the slot 52 easier and facilitates the installation by pivoting the card on the wiper arm until the arm is fully within the orifice 50. The type of material used to make these cards enables its deformation characteristics to be used in attaching it to the wiper arm 55. The stiffness of the material provides efficient means of clipping the card onto the wiper arm.

To remove the ticketing card 14 from the arm 55, one simply has to firmly pull on the card. The notch 56 creates a frangible zone which allows the card to rip and to be easily removed from the windshield wiper arm, thus preventing any future reuse of the card clipping system.

According to a second embodiment depicted in FIGS. 4A and 4B, the card 14 features a rounded opening 60 and a triangular V-shaped slot 62. A solid arrow-shaped part 64 defining the rounded opening 60 consists of a point 66 and two barbs 68. The wiper arm 70 is locked in the opening 60 by inserting the wiper arm between the point 66 and the notched edge 72 of the card. Once in the opening 60, the point 66 is inserted into the triangular V-shaped slot 62. The plastic nature of the card enables its deformation possibilities to allow the arrow 64 to be inserted into the slot 62. Once the arrow 64 is completely entered in the slot 62, the barbs 68 prevent it from exiting the slot as the barbs 68 are blocked in the base of the slot when it is pulled. The flexibility of the plastic material allow it to deform around the precut part 74 which acts as a hinge.

To remove the card 14 from the arm 70, one simply has to pull firmly on the card. The hinge part 74 comprising a frangible zone owing to its special cut-out, rips and releases the card from the windshield wiper arm thus preventing any future reuse of the card clipping system.

It should be noted that an essential characteristic of the system according to the invention is the use of rapid communication technologies. In this respect, the system could use new technologies such as GPRS and UMTS called upon to replace the GSM system as well as the DAB system.

Improvements could be made to the input device without deviating from the scope of the invention. In this manner, it can be equipped with a touch screen and a virtual keyboard. In addition, the input device may be equipped with a fingerprint reader or a voice recognition program enabling to enter data without using the keyboard. Furthermore, the input device may be equipped with a miniature camera which would enable someone to be filmed or photographed during an identity check by the police officer and to automatically send the fingerprint, the film or photo to an appropriate file in order to verify the identity of the person.

What is claimed is:

1. A system for issuing and managing offence tickets comprising:
    a portable input device for orally recording therein data concerning a vehicle by a person in charge of ticketing a contravening vehicle;
    an information medium adapted to be issued to an owner of said vehicle and adapted to be presented in front of said input device so as to record onto said information medium vehicle-related data entered into said input device;
    clipping means enabling said person to clip said information medium onto a windshield wiper arm of said contravening vehicle, such that said informatien medium is not damaged by rain and cannot easily be removed from said windshield wiper arm;
    a consultation device provided with a display screen, a printer and a means for reading said information medium to enable said vehicle owner to print information relative to the offence displayed on said display screen;
    a processing center containing information relative to a plurality of registered vehicles;
    a microwave link transmission means located in said input device to enable said person to obtain information concerning said vehicle from said processing center;
    wherein said portable input device comprises voice recognition means so that said person may orally register information relative to said vehicle; and
    wherein said information medium is an unalterable and tamper-resistant contactless smart card adapted to be presented in front of said portable input device in order to register therein information relative to said vehicle.

2. The system of claim 1, in which said consultation device is at the same time a payment device enabling the vehicle owner to pay a fine, the information relative to which were recorded in the information medium.

3. The system of claim 1, further comprising a follow-up file adapted to record information transmitted by a data acquisition terminal during a predetermined time prior to processing.

4. The system of claim 1, wherein said processing center nas automatic access to a vehicle registration file so that said input device receives information indicating whether the vehicle is stolen in answer to transmission of the vehicle's license number by said input device.

5. The system of claim 1, wherein said input device includes a camera to enable a driver of the vehicle to be filmed or photographed and to transmit the photograph or film to said processing center in order to obtain the identification of said driver.

6. The system of claim 1, wherein the clipping means comprises an opening prolonged by a slot terminated on an edge of said information medium by a notch enabling the wiper arm to be inserted into the slot until it penetrates said opening.

7. The system of claim 6, wherein a notch located in said opening forms a frangible zone enabling said information medium to be separated from the windshield wiper arm by pulling on said medium in order to rip it starting from said notch.

8. The system of claim 1, wherein said clipping means comprise an arrow-shaped part comprising a point and two barbs, in combination with a triangular V-shaped slot adapted to permit insertion of said arrow-shaped part once the windshield wiper arm has been introduced into a rounded opening delimited by said arrow-shaped part.

9. The system of claim 8, wherein a hinge part connecting the arrow-shaped part to the rest of the information medium comprises a frangible zone enabling said information medium to be separated from the windshield wiper arm by pulling on said information medium to rip it in the location of said hinge part.

* * * * *